United States Patent
Wang et al.

(10) Patent No.: US 6,409,191 B1
(45) Date of Patent: Jun. 25, 2002

(54) AUTOMATIC RESTORING DEVICE OF A SCOOTER'S WHEEL

(76) Inventors: Leao Wang; Peter Wu, both of No 1, Lane 233, Sec. 2, Charng Long Rd., Taiping (TW), 411

( * ) Notice: Subject to any disclaimer, the term of this patent is extended or adjusted under 35 U.S.C. 154(b) by 0 days.

(21) Appl. No.: 09/688,284

(22) Filed: Oct. 16, 2000

(51) Int. Cl.⁷ .................................................. B62M 1/00
(52) U.S. Cl. .............................. 280/87.041; 280/87.03; 280/87.042
(58) Field of Search .................. 280/87.05, 87.041, 280/87.042, 87.03, 11.27, 11.28, 87.01, 87.021, 47.131; 16/2.1; 301/126; 180/400; 464/179

(56) References Cited

U.S. PATENT DOCUMENTS

| | | | | |
|---|---|---|---|---|
| 3,801,209 A | * | 4/1974 | Matsuoka | 16/2.1 |
| 5,263,725 A | * | 11/1993 | Gesmer et al. | 280/11.28 |
| 5,456,330 A | * | 10/1995 | Kojima et al. | 180/400 |
| 5,711,539 A | * | 1/1998 | Tang | 280/11.27 |
| 6,155,553 A | * | 12/2000 | Wang et al. | 280/11.28 |
| 6,182,985 B1 | * | 2/2001 | Wang et al. | 280/87.01 |
| 6,234,501 B1 | * | 5/2001 | Chen | 280/87.041 |
| 6,241,264 B1 | * | 6/2001 | Page | 280/11.27 |
| 6,279,930 B1 | * | 8/2001 | Chang et al. | 280/11.27 |
| 6,302,415 B1 | * | 10/2001 | Wang et al. | 280/11.27 |

* cited by examiner

*Primary Examiner*—J. J. Swann
*Assistant Examiner*—Laura B. Rosenberg
(74) *Attorney, Agent, or Firm*—Troxell Law Office PLLC; Kuo-Hsiung Chiu

(57) ABSTRACT

The present invention relates to an automatic restoring device of a wheel of a scooter which includes a footboard, a steering rod and an automatic restoring device. The footboard is connected with the steering rod and the automatic restoring device at a free end thereof. Moreover, one end of the steering rod is secured with the automatic restoring device. A shaft is pivotally installed in the shaft sleeve of the automatic restoring device. The shaft bushing and the resilient element tightly enclose the shaft while a firm connection with the shaft sleeve is secured. Furthermore, the automatic restoring device is brought into rotation in turning the steering rod so that the wheel is also turned to change direction. And the resilient element creates a restoring force because of being pressed so that the wheel restores itself by means of the resilient force of the resilient element of the automatic restoring device after the external force upon the steering rod is removed.

1 Claim, 3 Drawing Sheets

AUTOMATIC RESTORING DEVICE OF A SCOOTER'S WHEEL

BACKGROUND OF THE INVENTION

1. Field of the Invention

The present invention relates to an automatic restoring device of a scooter's wheel, and more particularly, to a device which enables the scooter's wheel to restore itself by means of the assembly of simple components.

2. Description of the Prior Art

The steering device of a conventional scooter, as shown in FIG. 3, is provided with two corresponding springs 13 between two wheels 12. In addition, the end of a control rod 11 is joined with the two springs 13. Accordingly, after the wheels 12 are driven by the control rod 11 to change direction and the external force upon the two springs 13 for turning the control rod 11 is removed, the wheels 12 restore themselves. Though an automatic restoring effect in using the conventional scooter can be reached, there are still the following drawbacks for the structural assembly and for the use:

1. Regarding the structure the two springs are exposed to the outside so that they may be stained by liquid or moisture. In addition, the springs are easily disconnected or deflected by means of a shock. As a result, the resilient structure is much influenced. Besides, the connection of the two springs to the wheels is complicated so that the assembly efficiency is bad.
2. Regarding the use, the two springs are connected with two wheels and the control rod in a body. If the resilient force of the springs can't reach an expected effect because of elastic fatigue or being defective, the restoring preciseness of the wheel may be much influenced due to the loss of balance between two springs.

SUMMARY OF THE INVENTION

It is a primary object of the present invention to overcome the drawbacks associated with the prior art and to provide an automatic restoring device of a wheel of a scooter which includes a footboard, a steering rod and an automatic restoring device. The footboard is connected with the steering rod and the automatic restoring device at a free end thereof. Moreover, one end of the steering rod is secured with the automatic restoring device. A shaft is pivotally installed in the shaft sleeve of the automatic restoring device. The shaft bushing and the resilient element tightly enclose the shaft while a firm connection with the shaft sleeve is secured. Furthermore, the automatic restoring device is brought into rotation in turning the steering rod so that the wheel is also turned for changing direction. And the resilient element creates a restoring force because of being pressed so that the wheel restores itself by means of the resilient force of the resilient element of the automatic restoring device after the external force upon the steering rod is removed.

BRIEF DESCRIPTION OF THE DRAWINGS

The accomplishment of this and other objects of the invention will become apparent from the following description and its accompanying drawings of which.

DETAILED DESCRIPTION OF THE PREFERRED EMBODIMENT

Figure 1:
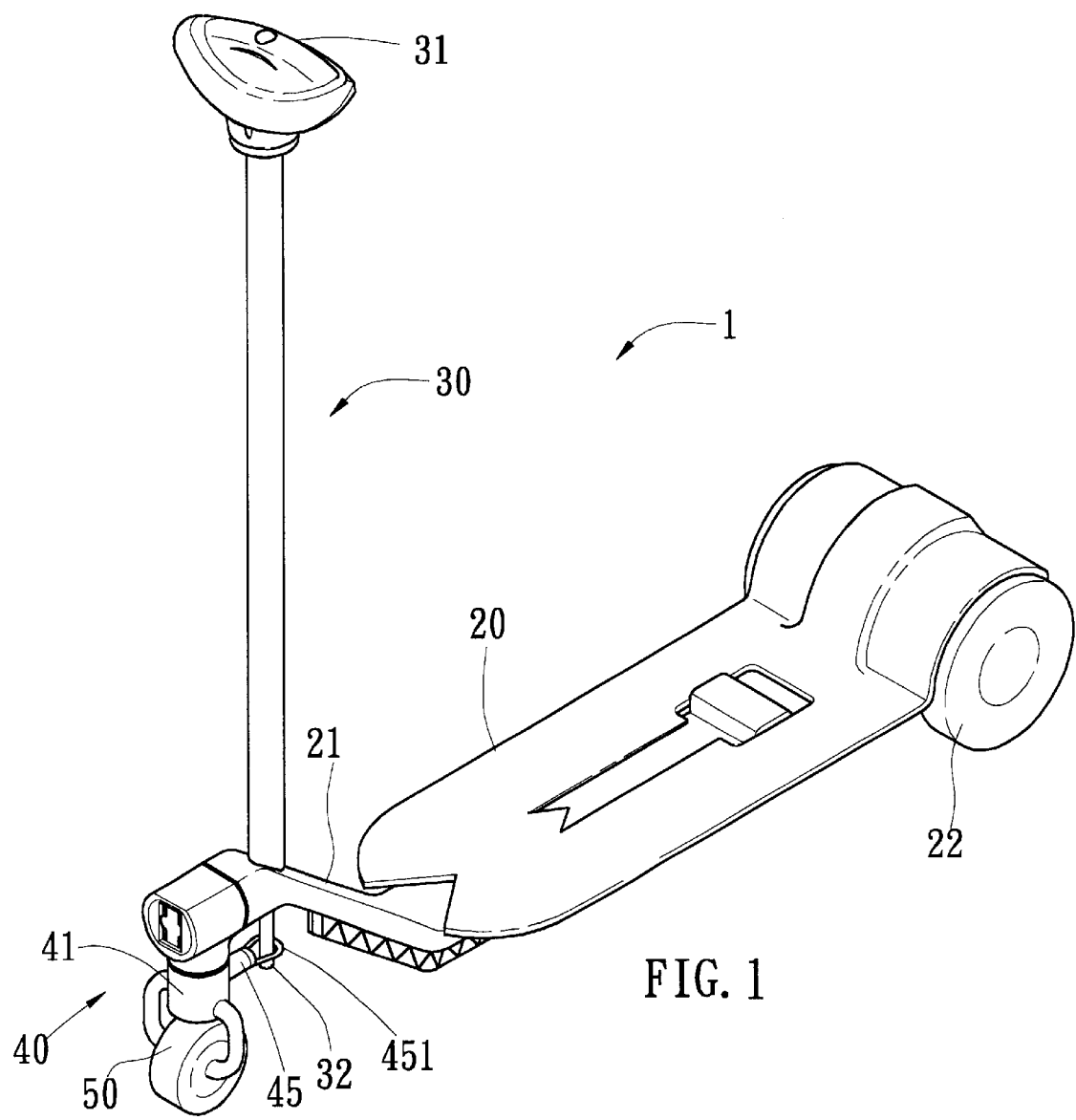
FIG. 1 is a perspective view of a preferred embodiment of the present invention after assembly.
Figure 2:
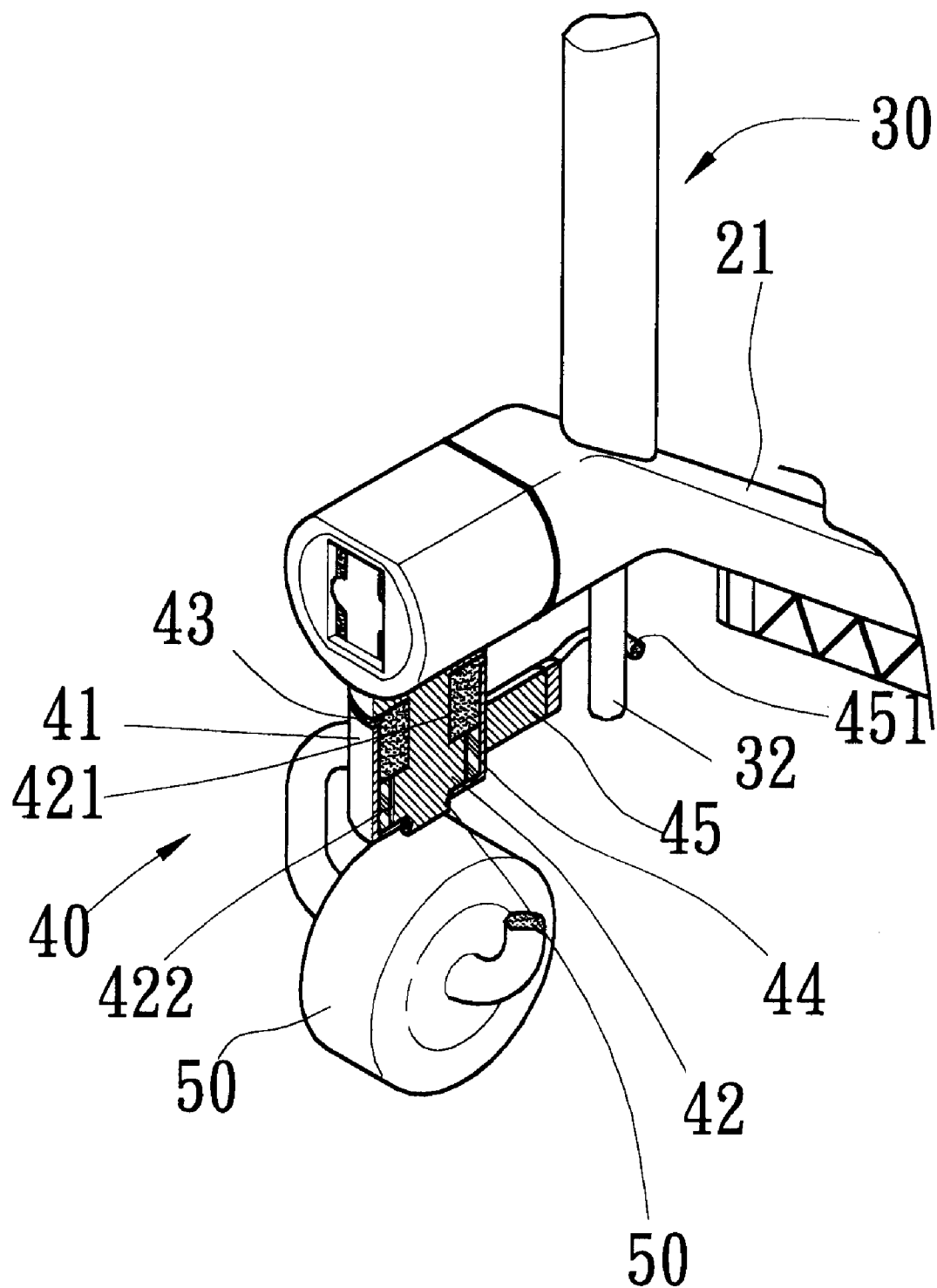
FIG. 2 is a sectional view of the partial assembly structure of FIG. 1.
Figure 3:
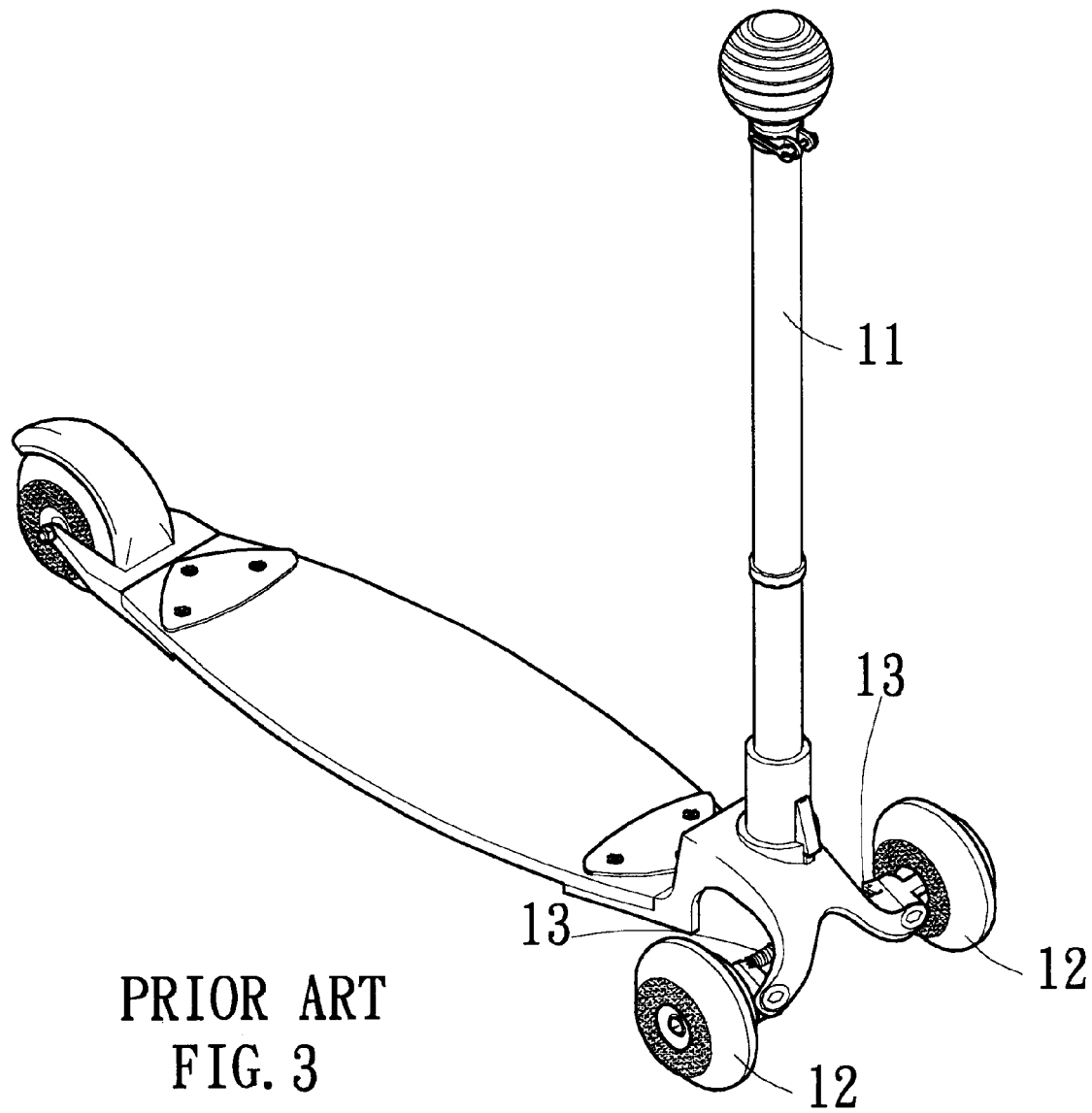
FIG. 3 is a perspective view of a conventional scooter.

Referring to FIGS. 1 and 2, the automatic restoring device of a wheel of a scooter 1 in accordance with the present invention includes:

a footboard 20 formed by a plate, a connecting extension part 21 being disposed at one end thereof, a rear wheel assembly 22 being pivotally fitted at the other end thereof;

a steering rod 30 formed in a long and upright body and pivoted on the connecting extension part 21, a handgrip 31 being disposed at top thereof, an extension post 32 being disposed at bottom thereof and penetrating through the extension part; and an automatic restoring device 40 composed of a shaft sleeve 41, a shaft 42, a shaft bushing 43 and a resilient element 44, a wheel 50 being connected to the outer side thereof.

The shaft sleeve 41 is formed in a hollow body for a pivotal reception of the shaft 42 which is axially fitted with a groove 421 and an extension 422. The groove 421 is firmly enclosed by the shaft bushing 43 while the extension 422 is tightly connected with said resilient element 44. In addition, the shaft sleeve 41 is fitted with a lateral push rod 45 at outer side thereof and opposite to the corresponding position to the footboard 20. A loop 451 is disposed at end of the lateral push rod 45 and used for the extension post 32 of the steering rod 30 to plug into.

Accordingly. the automatic restoring device of a wheel of a scooter is easy to assemble. Meanwhile, the automatic restoring effect after changing direction is more exact and the structure is more stable.

The feature of the present invention in structure is shown as follows. The shaft bushing 43 and the resilient element 44 firmly enclose the shaft 42. When the shaft sleeve 41 is joined with the shaft 42, the shaft bushing 43 and the shaft sleeve 41 are tightly secured. In turning the steering rod 30 to the right and to the left, the automatic restoring device 40 is brought into rotation. At the same time, the resilient element 44 creates a restoring force because of being pressed. When the external force upon the steering rod 30 is removed, the wheel 50 restores itself by means of the resilient force of the resilient element 44 of the automatic restoring device 40.

Furthermore, in order to strengthen the pivotal connection between the shaft 42 and the shaft sleeve 41, a C-ring 46 is installed to the outer side of the shaft sleeve 41.

Many changes and modifications in the above-described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A scooter having an automatic restoring device for a steered wheel and comprising:
   a) a footboard having front and rear ends with an extension part extending from the front end and a rear wheel assembly mounted at the rear end;
   b) an elongated steering rod extending upwardly from the extension part, the steering rod including an extension post protruding downwardly from the extension part;
   c) a front wheel steered by movement of the elongated steering rod; and,
   d) an automatic restoring device attached between the extension part and the front wheel and including:

i) a shaft extending downwardly from the extension part, the shaft having a groove and an adjacent extension;
ii) a shaft sleeve concentrically enclosing the shaft, the front wheel being connected to the shaft sleeve;
iii) a shaft bushing mounted between the groove of the shaft and the shaft sleeve;
iv) a resilient element mounted between the extension of the shaft and the shaft sleeve; and,
v) a lateral push rod extending from the shaft sleeve and having a loop thereon engaged by the extension post of the steering rod.

* * * * *